United States Patent Office 2,816,780
Patented Dec. 17, 1957

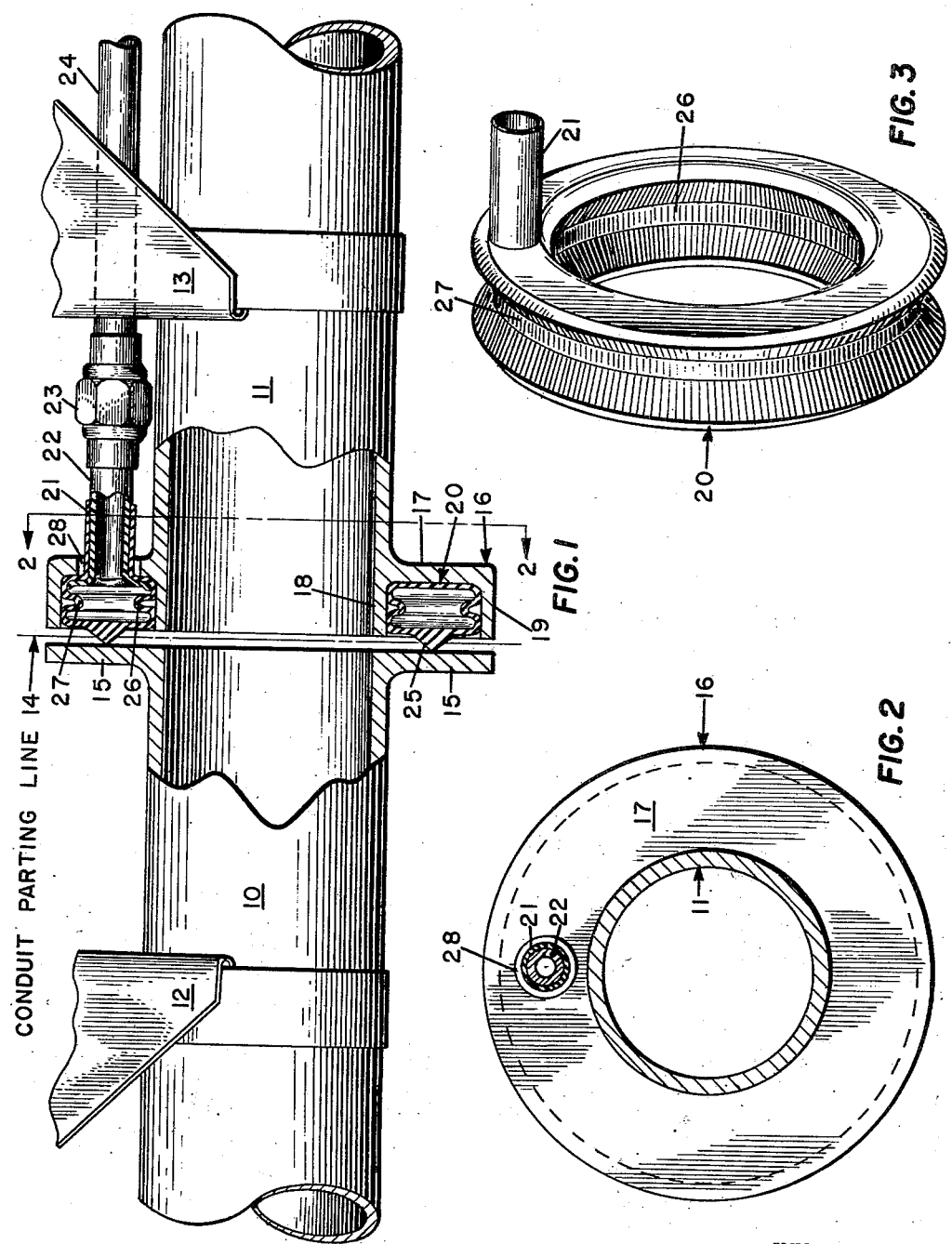

2,816,780

CONDUIT REMOTE CONTROL QUICK-DETACHABLE SEALING CONNECTOR WITH DEFLATABLE GASKET

Norman R. Ross, Dallas, Tex., assignor to Chance Vought Aircraft, Incorporated, Dallas, Tex., a corporation of Delaware Application March 14, 1955, Serial No. 493,925

6 Claims. (Cl. 285—97)

This invention pertains to a quick-detachable and quick-attachable, fluid-tight gasket sealing connector between the ends of two adjacent separable sections of a fluid conduit, at a hinge joint, for example, wherein relative angular and/or axial motion may exist between the ends of the sections due to vibratory and/or expansive contractive forces, or the like.

More specifically, this invention relates to an inflatable and extensible fluid pressure sealing connector for separable conduit sections wherein, whenever the separable sections are moved or pivoted into juxtaposition with each other, they may be readily and quickly joined together in a fluid-tight manner.

A principal object of the present invention is to provide a conduit gasket sealing system that is better adapted to meet the requirements of practice than those used for the same purpose up to the present time.

Another object of this invention is to provide an improved inflatable and extensible fluid pressure sealing connector for separable conduit sections for joining the sections together in a fluid-tight manner.

A still further object of this invention is to provide a quick-detachable sealing connector for pipes, conduits, or pressure or vacuum vessel sections which will provide a fluid-tight seal under severe pressure differences and temperature conditions in the presence of substantial relative multidirectional movement between the sections, and particularly, to maintain a fluid-tight seal even when there may be a non-axial alignment of the conduit sections.

Yet another object of this invention is to provide between two separable conduit sections, a fluid-tight sealing connector that requires no external clamps or fastening means to connect or disconnect the sections.

Another object of this invention is to provide a remotely controlled sealing connector for two separable conduit sections which may lie in a restricted or inaccessible area.

Another object of my invention is to provide a more efficient, lighter in weight, durable, inexpensive to manufacture, and self-protective from flow erosion sealing connector for two adjacent separable section ends of a conduit.

Other objects and advantages of the invention will be apparent from the following detailed description, together with the accompanying drawings, submitted for purposes of illustration only and not intended to define the scope of the invention, reference being had for that purpose to the subjoined claims.

In the drawings:

Fig. 1 is a plan view of two separable section ends of a conduit joined together in a fluid-tight manner with parts cut away for clarity of disclosure;

Fig. 2 is a sectional view taken at 2—2 on Fig. 1; and

Fig. 3 is a perspective view of the flexible, extensible sealing bladder.

As an example of the present invention, but not in limitation thereof the instant invention will be described as it has been applied to a dump fuel line at the joint in an aircraft folding wing, but it is obvious that this invention may be applied to other and various forms of conduit closure members, as in fluid brake line couplings between two or more vehicles as a truck-trailer, trains, etc.

Broadly, this invention is used in connecting two conduit sections which are to be sealed in a fluid-tight manner by merely bringing the sections into juxtaposition with each other and applying fluid pressure in a pressure chamber on one of the sections to seal it with a flange on the other section.

Referring to Fig. 1, two sections 10 and 11 of a conduit which may be used as a fuel dump line in an aircraft folding wing are illustrated with conduit strap mounting brackets 12 and 13 for fasting the respective sections 10 and 11 to two pivotally or hingedly interconnected wing sections of an aircraft (not shown). Accordingly, conduit sections 10 and 11 are pivotally interconnected through mounting brackets 12 and 13 attached to the hingedly interconnected wing sections. Conduit sections 10 and 11 disengage or separate from each other and join each other at conduit parting line 14. Further, it is noted that the wing fold hinge axis may be on or adjacent to line 14 illustrated. This fuel dump line is a conduit extending from a fuel tank in the fuselage or inner fixed portion of the wing, through the wing fold joint, and through at least a portion of the outer foldable wing portion for dumping the fuel overboard of the aircraft, when necessary. With the wings extended and in unfolded position, the fuel conduit sections 10 and 11 are positioned substantially co-axial and collinear as illustrated in Fig. 1. With wings folded, the conduit sections 10 and 11 move with their respective wing sections and accordingly separate at the parting line 14.

Conduit section 10 has an annular flat radial flange or bearing plate 15 secured circumferentially to the section end adjacent the parting line 14. Conduit section 11 has an annular channel member or toroidal pressure chamber 16 formed circumferentially of the section end adjacent the parting line 14 with the annular base 17 of the channel member lying in a radial plane of the conduit and normal and concentric to the conduit longitudinal axis. Moreover, the inner and outer sides 18 and 19, respectively, of the channel member 16 comprise concentric cylinders with the inner side substantially coplanar with the conduit section 11. The open side of the annular channel member 16 faces the annular flat bearing plate 15 of the other section 10 in an axial direction whereby both the bearing plate of section 10 and the channel member of section 11 lie in substantially parallel planes.

A wholly toroidal extensible seal bladder gasket 20, Fig. 3, is completely housed in the annular channel member 16. As illustrated in Fig. 1, bladder stem 21, which protrudes through opening 28 in the annular base 17 of the annular channel member 16 is connected through nipple 22 and a conventional flared-type union 23 to a remotely controlled fluid pressure source 24 externally of the conduit 10, 11. Remote controlled fluid pressure pipe 24 leads from a suitable source of fluid under pressure, as the engine compressor bleed air for example. This source of fluid pressure is controlled by the operator, or pilot in my case, by any suitable valve (not shown). While seal bladder gasket 20 may consist of rubber or a vinyl plastic, the preferred embodiment comprises a strong fabric material, as cotton or any of the high strength synthetics, impregnated with rubber or the like. A further necessary characteristic in the material of the bladder is the ability to withstand a wide variation in temperature. An annular wedge-shaped sealing rib 25 formed on the end surface of the seal bladder 20 protrudes axially beyond the end of conduit section 11 to contact the adjacent end or flat bearing plate 15 of section 10 to take all wear and tear on the bladder gasket in providing a high pressure and efficient seal. To facilitate ample flexibility and expansion of the bladder gasket 20 for movement of the sealing rib 25 in and out of the channel member 16, grooves or folds 26 or 27 are formed in the respective inner and outer concentric peripherial surfaces of the toroidal bladder. Accordingly, with the application of fluid under pressure in extensible seal bladder 20, an effective fluid-tight seal around the conduit junction at the parting line 14 is maintained.

As may be seen in Fig. 1, a distinctive feature of the connector is that when the conduit sections are collinear, a fluid tight seal is provided even if they may have a slight axial misalignment in any one direction. It is further noted that whether the pressure internally of the conduit sections 10, 11 is greater or less than that externally of the conduit, a fluid-tight seal is assured and maintained. With seal bladder 20 offset radially outwardly from the conduit section walls, no protrusion or portion of the sealing connector is susceptible to flow erosion or the wearing away of exposed parts by the flow of fluid thereover as the extensible bladder gasket is completely housed in the annular channel member 16.

In operation, as in an aircraft, each of conduit sections 10 and 11 moves with its own wing section, so that with the wings folded, individual sections 10 and 11 are entirely separated from each other and the bladder gasket 20 is drawn completely within or internally of the annular channel member 16. Under normal operation with the wings unfolded and coplanar, the two conduit sections 10 and 11 are collinear, but not in use, and so under this condition of decreased pressure from remotely controlled pressure means 24, the toroidal extensible seal bladder 20 is not inflated and instead lies limply wholly internally or within channel member 16. When it is desired to jettison the fuel load, first, fluid under pressure is applied to the seal bladder, forcing sealing rib 25 hard against bearing plate 15 to provide an effective fluid-tight seal around the junction between sections 10 and 11. Then the existing fuel supply is blown out the fuel dump line or conduit sections 10, 11. In this position when the wings are extended, hingedly connected conduit sections 10 and 11 are pivoted to co-axial contiguous position for providing a remotely controlled quick-detachable gasket sealing system for the fuel jettison lines.

The most pertinent prior flexible connections between two sections of a conduit known, as disclosed in Patent 2,451,941, are unusable in my application for several reasons. While my seal is necessarily inflated with an outside source of fluid pressure, this prior patent utilizes its own conduit fluid pressure, is a self-inflatable seal, and accordingly would be detrimental in use with fuels, as gasoline, for example, because before the gasoline reaches the junction, it must be sealed. Further, the prior sealing connector is not a quick-attachable or quick-detachable connector due to the several clasp rings therearound. Still further, neither one of the prior conduit sections is able to support the bladder by itself as can at least one of my sections.

As disclosed above, a conduit quick-detachable gasket sealing system is provided that requires no external clamps or fastening means to connect or disconnect the conduit sections. Accordingly, since the conduit sections are sealed and unsealed by the application of fluid pressure in the seal bladder, the source and particularly the control of the fluid pressure is maintained remotely from the seal bladder. This remote control feature of the sealing system is of noteworthy significance in the sealing of two adjacent conduit section ends which may be positioned in a restricted or inaccessible area. Moreover, the disclosed sealing connector is highly efficient light in weight, durable, and inexpensive to manufacture.

It will be obvious to those skilled in the art that various changes may be made in the invention without departing from the spirit and scope thereof and therefore the invention is not limited by that which is shown in the drawings and described in the specification, but only as indicated in the appended claims.

I claim:

1. A remote controlled quick-detachable gasket sealing system, for use in an aircraft having a fluid conduit in a foldable wing comprising, two hingedly connected conduit sections for transferring fluid from one conduit section to the other conduit section, brackets connected to said conduit sections for attachment of said sections to the wing on the aircraft, said conduit sections having free ends movable between a closed co-axial contiguous position relative to each other for quick detachable sealing engagement and an open widely separated position, a flat radial bearing plate secured to one of said conduit section free ends circumferentially thereof and an annular channel member circumpositioned on the other of said conduit section free ends of said hingedly connected conduit sections, said pressure chamber comprising a completely annular channel member having a base lying substantially in a radial plane of said other conduit section end, a wholly toroidal extensible bladder gasket completely housed in said annular channel member having an annular surface facing outwardly of said channel member and axially of said other section free end of hingedly connected conduit sections, an annular sealing rib protruding from the center of said bladder outwardly facing surface, and a stem means projecting from the outwardly facing surface of the bladder opposite said surface and connected to a remotely controlled fluid pressure means externally of said conduit sections, said controlled fluid pressure means comprising means for extending said bladder and forcing said sealing rib into sealing engagement with said flat radial bearing plate of said one conduit section free end after said hingedly connected conduit sections are pivoted to co-axial contiguous position for providing a remotely controlled quick-detachable gasket sealing system, and said controlled fluid pressure means comprising means for contracting and retaining said bladder wholly internally of said annular channel member.

2. A remote controlled quick-detachable gasket sealing system, for use in an aircraft having a fluid conduit in a foldable wing comprising, two hingedly connected conduit sections for transferring fluid from one conduit section to the other conduit section, said conduit sections having free ends movable between the co-axial contiguous position relative to each other for quick detachable sealing engagement and an open widely separated position, an annular pressure chamber circumpositioned on one of said conduit section free ends and a flat radial bearing plate secured to the other of said conduit section free ends circumferentially thereof, said pressure chamber comprising a completely annular channel member, an extensible bladder gasket completely housed in said annular channel member having an annular surface facing outwardly of said channel member and axially of said one conduit section free end, an annular sealing rib protruding from said bladder surface, a stem means projecting from the outwardly facing surface of the bladder opposite said surface and connected to a remotely controlled fluid pressure means externally of said conduit sections for extending said bladder and forcing said sealing rib of said one conduit section free end into sealing engagement with said flat radial bearing plate of said other conduit section free end after said hingedly connected conduit sections are pivoted to co-axial contiguous position for providing a remotely controlled quick-detachable sealing system, and both said means contracting and retaining said extensible bladder wholly internally of said annular channel member.

3. A remote controlled quick-detachable gasket sealing system, for use in an aircraft having a fluid conduit in a foldable wing comprising, two hingedly connected conduit sections for transferring fluid from one conduit section to the other conduit section, said conduit sections having free ends between a closed co-axial contiguous position relative to each other for quick detachable sealing engagement and an open widely separated position, a toroidal pressure chamber on one of said conduit section free ends and a flat sealing means on the other of said conduit section ends, a bladder gasket completely housed in said conduit toroidal channel member having a sealing rib protruding from the chamber, a stem means projecting from said bladder and connected to a remotely controlled fluid pressure means externally of said conduit sections for extending said bladder and forcing said sealing rib of said one conduit section free end into flat sealing engagement with said sealing means of said other conduit section free end to provide a remotely controlled quick-detachable gasket sealing system, and said pressure means contracting and retaining said bladder wholly internally of said toroidal pressure chamber.

4. A remote controlled quick-detachable gasket sealing system, for use in an aircraft having a fluid conduit in a foldable wing comprising, two hingedly connected conduit sections for transferring fluid from one conduit section to the other conduit section, said conduit sections having free ends movable between a closed co-axial contiguous position relative to each other for quick detachable sealing engagement and an open widely separated position, a toroidal pressure chamber on one of said conduit section free ends and a flat radial bearing plate secured to the other of said conduit section free ends, and extensible gasket means completely housed in said toroidal pressure chamber having a sealing rib protruding from the chamber, said extensible gasket means being connected to a remotely controlled fluid pressure means externally of said conduit sections for extending said extensible gasket means and forcing said sealing rib of said one conduit section free end into sealing engagement with said flat radial bearing plate of said other conduit section free end to provide a remotely controlled quick-detachable gasket sealing system, said pressure means contracting and retaining said extensible bladder wholly internally of said toroidal pressure chamber.

5. A remote controlled quick-detachable gasket sealing system, for use in an aircraft having a fluid conduit in a foldable wing comprising, two hingedly connected conduit sections for transferring fluid from one conduit section to the other conduit section, and said conduit sections having free ends movable between a closed co-axial contiguous position relative to each other for quick detachable engagement and an open widely separated position, a toroidal pressure chamber on one of said conduit section free ends and a flat sealing means on the other of said conduit section free ends, a bladder gasket completely housed in said toroidal pressure chamber having a means protruding from the chamber, a stem means projecting from said bladder and connected to a remotely controlled fluid pressure means for extending said bladder gasket and forcing said protruding means of said one conduit section free end into sealing engagement with said flat sealing means of said other conduit section free end to provide a remotely controlled quick-detachable gasket sealing system, and said pressure means contracting and retaining said bladder wholly internally of said toroidal pressure chamber.

6. A remote controlled quick-detachable gasket sealing system, for use in an aircraft having a fluid conduit in a foldable wing comprising, two hingedly connected conduit sections for transferring fluid from one conduit section to the other conduit section, said conduit sections having free ends movable between the closed co-axial contiguous position relative to each other for quick detachable sealing engagement and an open widely separated position, a pressure chamber means on one of said conduit section free ends and a flat first sealing means on the other of said conduit section free ends, an extensible gasket means in said pressure chamber means having a second sealing means protruding from the chamber means, said extensible gasket means being connected to a remotely controlled fluid pressure means externally of said conduit for expanding said extensible gasket means and forcing said second sealing means of said one conduit section free end into sealing engagement with said flat first sealing means of said other conduit section free end to provide a remotely controlled quick-detachable gasket sealing system, and said pressure means contracting and retaining said extensible bladder wholly internally of said pressure chamber means.

References Cited in the file of this patent

UNITED STATES PATENTS

| | | |
|---|---|---|
| 658,588 | Reynolds et al. | Sept. 25, 1900 |
| 1,475,289 | Diescher | Nov. 27, 1923 |
| 2,099,722 | Byers | Nov. 23, 1937 |
| 2,306,160 | Freyssinet | Dec. 22, 1942 |
| 2,369,823 | Freed | Feb. 20, 1945 |
| 2,691,460 | Barnebey | Oct. 12, 1954 |
| 2,704,675 | Henderson | Mar. 22, 1955 |

FOREIGN PATENTS

| | | |
|---|---|---|
| 368,892 | France | Oct. 22, 1906 |
| 868,329 | France | Sept. 29, 1941 |
| 576,206 | Great Britain | Mar. 22, 1946 |